(12) United States Patent
Samdadiya et al.

(10) Patent No.: US 7,769,809 B2
(45) Date of Patent: Aug. 3, 2010

(54) ASSOCIATING REAL-TIME CONVERSATIONS WITH A LOGICAL CONVERSATION

(75) Inventors: Parag Samdadiya, Bellevue, WA (US); Amritansh Raghav, Seattle, WA (US); Danny Levin, Redmond, WA (US); Eran Shtiegman, Redmond, WA (US); Nikhil Bobde, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 961 days.

(21) Appl. No.: 11/195,342

(22) Filed: Aug. 2, 2005

(65) Prior Publication Data

US 2007/0033249 A1 Feb. 8, 2007

(51) Int. Cl.
*G06F 15/16* (2006.01)

(52) U.S. Cl. .................. 709/204; 709/224; 709/238; 370/352

(58) Field of Classification Search ................ 709/204, 709/224, 238; 370/352
See application file for complete search history.

(56) References Cited

U.S. PATENT DOCUMENTS

| | | | |
|---|---|---|---|
| 6,212,548 B1 * | 4/2001 | DeSimone et al. | 709/204 |
| 6,434,143 B1 | 8/2002 | Donovan | |
| 6,570,555 B1 | 5/2003 | Prevost et al. | |
| 6,859,451 B1 | 2/2005 | Pasternack et al. | |
| 7,317,716 B1 * | 1/2008 | Boni et al. | 370/352 |
| 7,328,242 B1 * | 2/2008 | McCarthy et al. | 709/204 |
| 7,401,158 B2 * | 7/2008 | Beauchamp et al. | 709/238 |
| 2002/0044535 A1 | 4/2002 | Tabata et al. | |
| 2002/0147818 A1 | 10/2002 | Wengrovitz | |
| 2003/0028595 A1 | 2/2003 | Vogt et al. | |
| 2003/0046316 A1 | 3/2003 | Gergic et al. | |
| 2003/0046433 A1 | 3/2003 | Luzzatti et al. | |
| 2004/0054737 A1 | 3/2004 | Daniell | |
| 2004/0078435 A1 | 4/2004 | Dunbar et al. | |
| 2004/0148332 A1 | 7/2004 | Parolkar et al. | |
| 2004/0162878 A1 | 8/2004 | Lewis et al. | |
| 2004/0261115 A1 | 12/2004 | Bartfeld | |
| 2005/0021826 A1 | 1/2005 | Kumar | |

(Continued)

FOREIGN PATENT DOCUMENTS

WO    WO 02/37812 A2    5/2002

(Continued)

OTHER PUBLICATIONS

U.S. Appl. No. 11/195,375, filed Aug. 2, 2005, Levin et al.

(Continued)

*Primary Examiner*—Tonia L M Dollinger
*Assistant Examiner*—Kyung H Shin
(74) *Attorney, Agent, or Firm*—Perkins Coie LLP (57) ABSTRACT

Techniques for associating one or more real-time sessions, which are each signaled separately, into one logical conversation without a centralized control, are provided. Some techniques share a conversation identifier that uniquely identifies a logical conversation across the real-time sessions that belong to the logical conversation. The conversation identifier is generated before the first real-time session belonging to the logical conversation is signaled, and distributed to the other participants in the logical conversation via the signaling channel. A called participant can use the conversation identifier for associating the previous real-time sessions belonging to the logical conversation, and for making new invitations for other real-time sessions that are associated with the same logical conversation.

23 Claims, 5 Drawing Sheets

U.S. PATENT DOCUMENTS

| | | | |
|---|---|---|---|
| 2005/0047389 A1 | 3/2005 | Bond et al. | |
| 2005/0050143 A1 | 3/2005 | Gusler et al. | |
| 2005/0055359 A1 | 3/2005 | Kawai et al. | |
| 2005/0094621 A1* | 5/2005 | Acharya et al. | 370/352 |
| 2006/0031331 A1 | 2/2006 | LoBuono et al. | |
| 2006/0059235 A1 | 3/2006 | Peterson et al. | |
| 2006/0080432 A1* | 4/2006 | Spataro et al. | 709/224 |
| 2007/0255791 A1 | 11/2007 | Bodlaender et al. | |

FOREIGN PATENT DOCUMENTS

WO     WO-2002037812     5/2002

OTHER PUBLICATIONS

"ICQ Sniffer 1.0," Internet Messenger Related Programs, Filebasket, Digital River, Inc. [Accessed Jun. 3, 2005] http://www.filebasket.com/product.php[id]77153[cid]164[SiteID]filebasket.

"MessengerLog 3 3.10," Internet Messenger Related Programs, Filebasket, Digital River, Inc. [Accessed Jun. 3, 2005] http://www.filebasket.com/product.php[id]63063[cid]164[SiteID]filebasket.

"ICQ Monitor version 1.1," Shareware Software, Tucows Inc., 2005, http://www.tucows.com/preview/376688.

"Net Logger Pro version 2.0," Shareware Software, Copyright Tucows Inc., 2005 [Accessed Nov. 15, 2005] http://www.tucows.com/preview/288664.

"Watch Right—Parental Monitoring System," Copyright BPS SoftWare 1994-2005 [Accessed Nov. 15, 2005] http://bpssoft.com/WatchRight/index.htm.

"MessengerLog 5 Pro," Shareware Software, Copyright Tucows Inc., 2005 [Accessed Nov. 15, 2005] http://www.tucows.com/preview/295840.

P. Saint-Andre, Ed., "Extensible Messaging and Presence Protocol (XMPP): Instant Messaging and Presence," Network Working Group, RFC 3921, Jabber Software Foundation, Standards Track, The Internet Society, Oct. 2004.

"MSN Monitor version 1.2," Shareware Software, Copyright Tucows Inc., 2005 [Accessed Nov. 15, 2005] http://www.tucows.com/preview/376687.

"AIM Monitor version 1.1," Shareware Software, Copyright Tucows Inc., 2005 [Accessed Nov. 15, 2005] http://www.tucows.com/preview/376686.

"Mirador Instant Messenger," Copyright Serial Scientific International Corporation, 2004 http://e-securion.com/instant-messenger.

Microsoft Technet, "Third-Party Information Sharing Applications for Microsoft Mail 3.2," Copyright Microsoft Corporation, 2005 http://www.microsoft.com/technet/archive/mail/addmail.mspx.

"Responsive Information Architect RIA," http://www.research.ibm.com/RIA/Research/RIA.htm.

Adelheit Stein and Ulrich Thiel, "A Conversational Model of Multimodal Interaction," Proc. Of the 11th National Conference on Artificial Intelligence (AAAI '03), Washington, DC, Jul. 11-16, 1993.

Microsoft TechNet: Non-Microsoft Information Sharing Application for Microsoft Mail, Copyright 2005, Microsoft Corporation (7 pages), http://www.microsoft.com/technet/archive/mail/addmail.mspx.

Zenka, Roman and Slavik, Pavel, "Multimodal Interface for Data Retrieval During Conversation," Czech Technical Unversity, Prague, Czech Republic, 19th International CODATA Converence, 2004 (6 pages).

Freedman, Reva, "Atlas: A Plan Manager for Mixed-Initiative, Multimodal Dialogue," AAAI- '00 Workshop on Mixed-Initiative Intelligence, Jul. 19, 1999, Orlando, FL (8 pages).

Microsoft Technet, "Microsoft Masthead Frame with Global Toolbar," (1 page), http://www.microsoft.com/TechNet/mnp_utility.mspx/masthead?url=/technet/archive/mail/a [last accessed Jun. 3, 2005].

Microsoft Navigation Menu Frame (2 pages), http://www.microsoft.com/TechNet/mnp_utility.mspx/masthead?url=/technet/archive/ma [last accessed Jun. 3, 2005].

* cited by examiner

INVITE sip:parags7@phonetest.rtmp.selfhost.corp.microsoft.com SIP/2.0
Via: SIP/2.0/TCP 172.27.174.137:15071
Max-Forwards: 70
From: "parags6"
<sip:parags6@phonetest.rtmp.selfhost.corp.microsoft.com>;tag=51b61ac6106543e08aef153c321fa9fb;epid=3e54fc2b4d
To: <sip:parags7@phonetest.rtmp.selfhost.corp.microsoft.com>
Call-ID: 9a80183c3373489ebc1b7574f8f97d8e
CSeq: 1 INVITE
Contact: <sip:parags6@phonetest.rtmp.selfhost.corp.microsoft.com:15071;maddr=172.27.174.137;transport=tcp>;proxy=replace
User-Agent: LCC/1.3

302 —— Ms-Conversation-ID: 39D0D1D6-5CEA-4463-A17C-1246FBD7F164

Proxy-Authorization: Kerberos qop="auth", realm="SIP Communications Service", opaque="053A12AA", crand="0c42a85d", cnum="11", targetname="sip/z03-lct.phonetest.rtmp.selfhost.corp.microsoft.com", response="602306092a864886f71201020201011100ffffffffeb9ac7ea2bda2e668102c8f1dfb7ec7"
Content-Type: application/sdp
{
SDP
{

ASSOCIATING REAL-TIME CONVERSATIONS WITH A LOGICAL CONVERSATION

BACKGROUND

Users of computing devices (e.g., laptops, cellular phones, and personal digital assistants) often need to communicate in real time. A common form of real-time communications is provided by instant messaging services. An instant messaging service allows a participant at an endpoint to send messages and have them received within a second or two by the other participant in a conversation. The receiving participant can then send responsive messages to the other participant in a similar manner.

To support real-time communications, communications applications typically need to establish and manage connections (also referred to as sessions or dialogs) between computing devices. A session is a set of interactions between computing devices that occurs over a period of time. As an example, instant messaging services require a networking protocol to establish and manage communications between participants. These services may use various mechanisms to establish sessions, such as a "Session Initiation Protocol" ("SIP"). SIP is an application-level control protocol that computing devices can use to discover one another and to establish, modify, and terminate sessions between computing devices. SIP is a proposed Internet standard. The SIP specification, "RFC 3261," is available at <http://www.ietf.org/rfc/rfc3261.txt>.

A SIP network comprises entities that can participate in a dialog as an endpoint, server, or both. SIP supports four types of entities: user agent, proxy server, redirect server, and registrar. User agents initiate and terminate sessions by exchanging messages with other SIP entities. A user agent can be a user agent client, which is generally a computer system that initiates SIP requests, or a user agent server, which is a computer system that generally receives SIP requests and responds to such requests. As examples, "IP-telephones," personal digital assistants, and various other types of computing systems may be user agents. A computer system can be a user agent client in one dialog and a user agent server in another, or may change roles during the dialog. A proxy server is an entity that acts as a server to clients and a client to servers. In so doing, proxy servers intercept, interpret, or forward messages between clients and servers. A redirect server accepts a SIP request and generates a response directing the client that sent the request to contact an alternate network resource. A registrar is a server that accepts registration information from SIP clients and informs a location service of the received registration information.

SIP supports two message types: requests, which are sent from a client to a server, and responses, which are sent from a server to a client, generally when responding to a request. A SIP message is comprised of three parts. The first part of a SIP message is a "start line," which includes fields to indicate a message type and a protocol version. The second part of a SIP message comprises header fields whose values are represented as name-value pairs. The third part of a SIP message is the message's body, which is used to describe the session to be initiated or contain data that relates to the session. Message bodies may appear in requests or responses.

To start a conversation, an inviting participant typically sends an invitation from an endpoint to the instant messaging service, which then forwards the invitation to an endpoint for the receiving participant. The invitation can take place using the SIP INVITE protocol. The endpoint for the receiving participant then accepts the invitation, forming a conversation between the two participants which is typically represented as a conversation window at each participant's instant messaging endpoint. The participants can then each type messages back and forth to each other until the conversation is terminated by either of the participants by, for example, closing the conversation window.

It is becoming increasingly common for multiple participants to be involved in a conversation. For example, today's businesses often assign business projects to work groups with members physically located in disparate locations, and these members need to be involved in the same conversation. However, because typical instant messaging services rely on a point-to-point protocol, such as SIP, a conversation is limited to the two participants who are engaged in an instant messaging session. If another, third participant who wants to join the existing conversation establishes an instant messaging session with either one of the two participants who are currently engaged in the existing conversation, typical instant messaging services do not provide a mechanism for indicating or associating the newly created instant messaging session with the existing conversation. Rather, two distinct conversations, each involving two of the three participants, are created.

SUMMARY

Techniques for associating one or more real-time sessions, which are each signaled separately, into one logical conversation without a centralized control, are provided. The techniques are based on sharing a conversation identifier that uniquely identifies a logical conversation across the real-time sessions that belong to the logical conversation. The conversation identifier is generated before the first real-time session belonging to the logical conversation is signaled, and distributed to the other participants in the logical conversation via the signaling channel. A called participant can use the conversation identifier for associating the previous real-time sessions belonging to the logical conversation, and for making new invitations for other real-time sessions that are associated with the same logical conversation.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Various techniques for associating one or more real-time sessions, which are each signaled separately, into one logical conversation without a centralized control, are provided. The described techniques share a unique conversation identifier that identifies a logical conversation across one or more real-time sessions that belong to the same logical conversation. As used herein, the terms "logical conversation" or "conversation" are used interchangeably and generally refer to one or more real-time sessions, where each session is between participants at two endpoints or user agents.

In some embodiments, a calling participant (e.g., a human user) may execute a client application on his or her client computing system and request to establish a real-time communication service session with a called participant. Upon receiving this request from the calling participant, the client application determines whether it is an initiator of a logical conversation. For example, the client application may determine that it is an initiator of a logical conversation if the requested real-time session is the first session that is created in the logical conversation at the client. In some embodiments, the client application may determine that it is an initiator of a logical conversation if the requested real-time session is the first session that is being created by this particular instance of the client application executing on the client. If the client application determines that it is the initiator of the logical conversation, the client application generates a unique conversation identifier for the logical conversation, and sends the unique conversation identifier along with a request to the called participant to establish or create the real-time session. In some embodiments, the client application may associate the real-time session to the logical conversation after establishing the real-time session. For example, the client application may create a record in a database that identifies the logical conversation and the created real-time session.

If the client application determines that it is not the initiator of the logical conversation (i.e., the requested real-time session is not the first session that is created in the logical conversation), the client application identifies an existing logical conversation and the existing conversation identifier that uniquely identifies the existing logical conversation. The client application then sends the existing conversation identifier along with a request to the called participant to establish or create the real-time session. In some embodiments, the client application may associate the real-time session to the existing logical conversation after establishing the real-time session. Since the existing logical conversation already contained one or more prior real-time sessions on the client (i.e., one or more prior real-time sessions are associated with the existing logical conversation), associating the newly created real-time session to the existing logical conversation in effect associates the prior real-time sessions and the newly created real-time session to each other and to the same logical conversation on the client.

At the called participant's client, upon receiving the request to create the real-time session, the client application determines whether the conversation identifier that was received with the request identifies a logical conversation that is currently active on the client. If the received conversation identifier identifies a logical conversation that is currently active on the client, the client application associates the received request to create the real-time session to the currently active logical conversation identified by the received conversation identifier.

Conversely, if the received conversation identifier does not identify (e.g., does not match) a logical conversation that is currently active on the client, the client application creates a new logical conversation on the client. The client application may identify the newly created logical conversation using the received conversation identifier. The client application associates the received request to create the real-time session to the newly created logical conversation.

In some embodiments, the client application may decide if a new session is part of an existing logical conversation after establishing the session and querying about other existing logical conversations on the remote side (i.e., remote client). In some embodiments, the client application may decide that a new session belongs to an existing logical conversation based on proximity of new session creation times with other sessions.

In some embodiments, the request to establish the real-time session may be signaled using an application protocol such as SIP or any of a variety of well-known application protocols suitable for establishing the real-time session between the two participants, and the unique conversation identifier may be included as part of the application protocol. For example, the unique conversation identifier may be included in the header of a SIP message. In some embodiments, the unique conversation identifier may be sent separate or apart from the message requesting the establishment of the real-time session.

Figure 1:
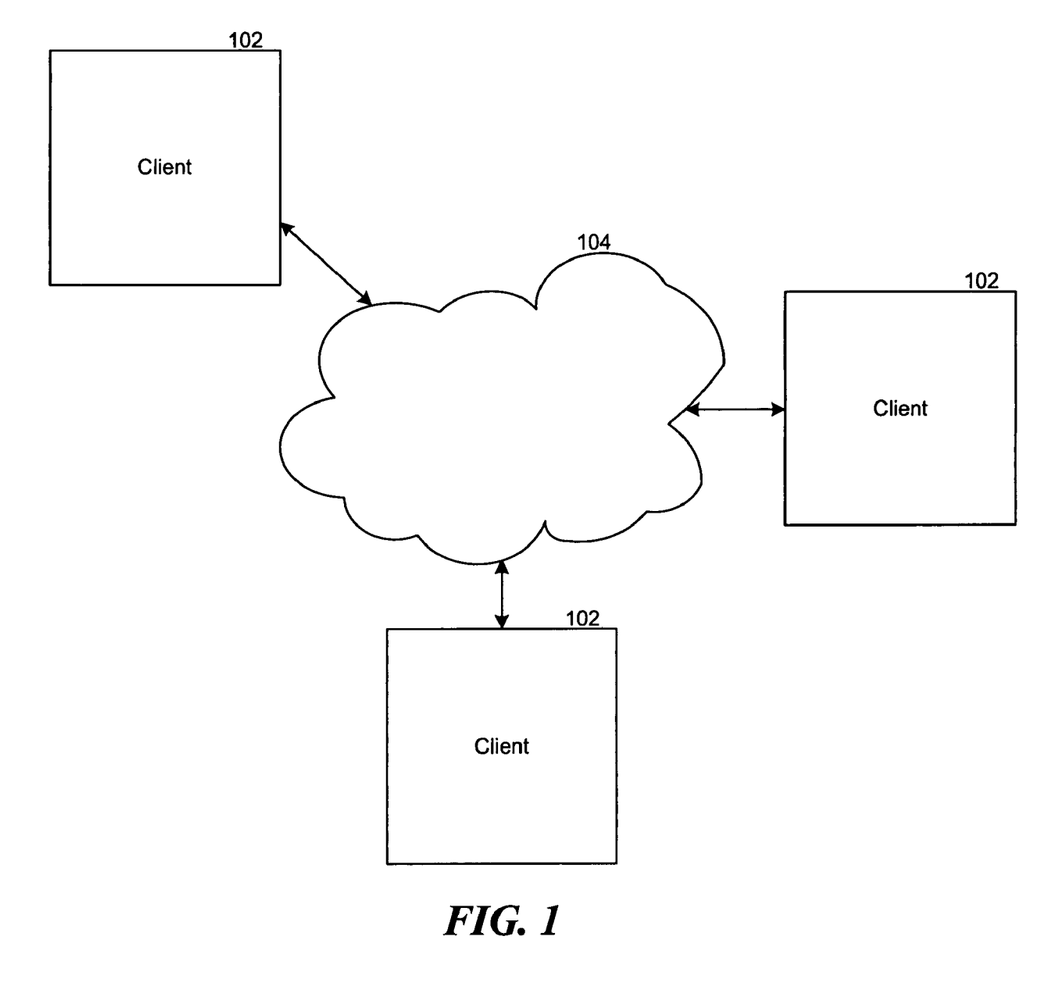
FIG. 1 is a high-level block diagram showing an environment in which the logical conversations may operate.

FIG. 1 is a high-level block diagram showing an environment in which the logical conversations may operate. As depicted, the environment comprises a plurality of client computing systems 102 each coupled to a network 104. In general terms, each client computing system allows a user, such as a human user, to participate in one or more logical conversations. For example, a user at one of the clients may at act as a calling participant and use the client and, in particular, an application program executing on the client to request a real-time session with a called participant, for example, at another client computing system. If the real-time session is the first session in a logical conversation, the calling participant's client generates a conversation identifier that uniquely identifies the logical conversation. In this instance, the calling participant's client is originating the logical conversation. If the real-time session is not the first session, the calling participant's client determines the conversation identifier of an existing logical conversation (i.e., the conversation identifier that uniquely identifies the existing logical conversation). For example, the calling participant may already be participating in one or more logical conversations with one or more other participants, and may have requested the real-time session with the called participant within one of the logical conversations. In this instance, the calling participant's client is extending the existing logical conversation within which the calling participant made the request to include the requested real-time session.

The calling participant's client sends the called participant's client the request to establish a real-time session and the conversation identifier. Upon establishing the real-time session with the called participant, the calling participant's client associates the newly created real-time session to the conversation identifier. In this manner, the newly created real-time session becomes either, the first session in the logical conversation (e.g., in the case that the calling participant's client initiated the logical conversation), or associated with the other real-time sessions that already belong to the existing logical conversation (e.g., in the case that the calling participant's request was made within an already existing logical conversation).

The called participant's client receives the request to establish a real-time session and the conversation identifier, and attempts to match the conversation identifier to all the logical conversations that are active on the client. If a match is found, the called participant's client associates the request to establish the real-time session to the logical conversation that is active on the client (e.g., the logical conversation running on the client that is identified by the conversation identifier). Otherwise, if no match is found (i.e., there are no logical conversations running on the client or none of the logical conversations running on the client are identified by the conversation identifier), the called participant's client creates a new logical conversation and associates the request to establish the real-time session to the newly created logical conversation. Having associated the request to establish the real-time session to either a currently running logical conversation or a newly created logical conversation, in some embodiments, the client may provide the called participant an indication of the received request to establish the real-time session. For example, if a currently running logical conversation was found on the client, the client may provide the indication of the received request within the user interface for the currently running logical conversation. Otherwise, if a new logical conversation was created on the client, the client may provide the indication of the received request within a user interface created for the newly created logical conversation.

The called participant may then accept the requested real-time session with the calling participant. Upon establishing the real-time session with the calling participant, the called participant's client associates the newly created real-time session to the conversation identifier received from the calling participant. In this manner, the newly created real-time session becomes either, a first session in the logical conversation (e.g., in the case that the called participant's client created the logical conversation), or associated with the other real-time sessions that already belong to the currently running logical conversation (e.g., in the case that the called participant's client successfully matched the received conversation identifier to the logical conversation running on the client).

The calling participant may then establish one or more other real-time sessions with the called participant or one or more other participants within the same logical conversation. Likewise, called participant may act as a calling participant and establish one or more other real-time sessions with the calling participant or one or more other participants within the same logical conversation. In this manner, multiple real-time sessions may be associated with a single logical conversation.

In general terms, the network is a communications link that facilitates the transfer of electronic content between, for example, the attached client computing system and server computing system. In one embodiment, the network includes the Internet. It will be appreciated that the network may be comprised of one or more other types of networks, such as a local area network, a wide area network, a point-to-point dial-up connection, and the like. In some embodiments, the network may include one or more server computing systems. In general terms, the server computing system may facilitate the establishment of the real-time session between the calling participant's client and the called participant's client. For example, the calling participant's client may send a request to establish a real-time session with a called participant to an appropriate server computing system, and the server computing system may forward the request to the called participant's client.

The client computer system may include one or more central processing units, memory, input devices (e.g., keyboard and pointing devices), output devices (e.g., display devices), and storage devices (e.g., disk drives). The memory and storage devices are computer-readable media that may contain instructions that implement the various techniques for associating one or more real-time sessions into one logical conversation, described herein. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on. One of ordinary skill in the art will appreciate that the computer systems may be of various configurations having various components.

Embodiments of the described techniques may be implemented in various operating environments that include personal computers, server computers, computing devices, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, kiosks, ATMs, and so on.

The various techniques for associating one or more real-time sessions into one logical conversation may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
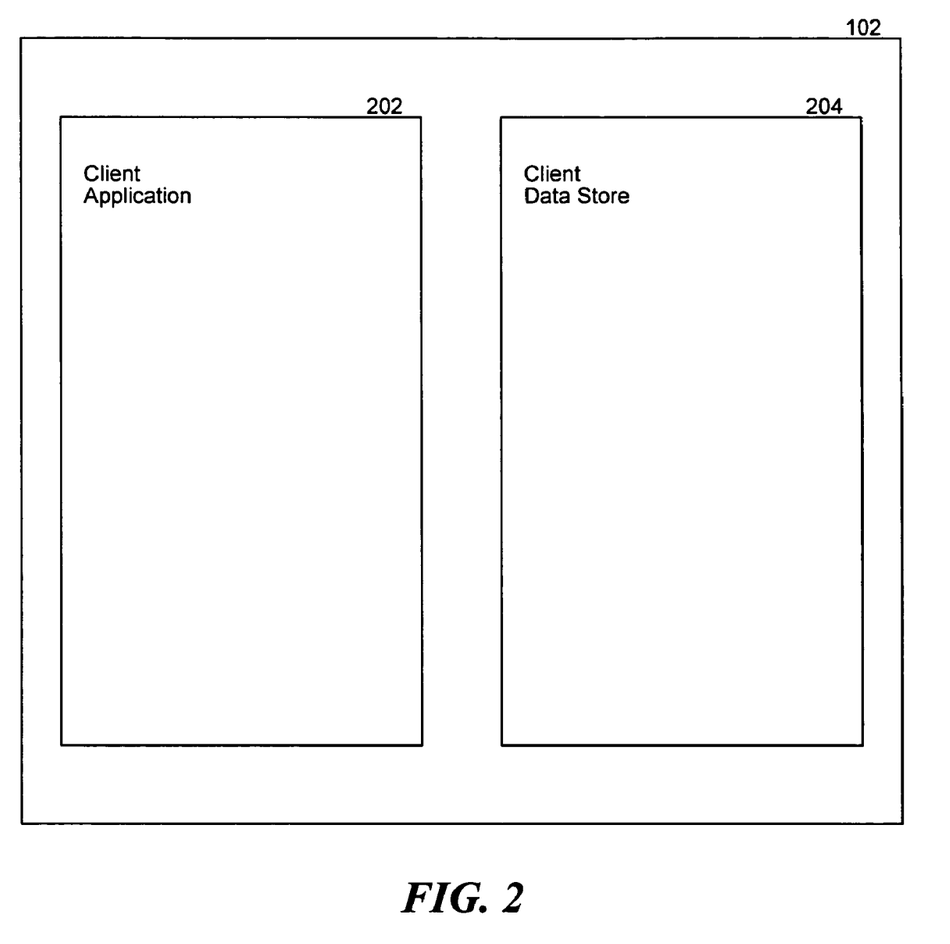
FIG. 2 is a block diagram illustrating selected components of a client, according to some embodiments.

FIG. 2 is a block diagram illustrating selected components of a client, according to some embodiments. As depicted, client 102 comprises a client application 202 and a client data store 204. In general terms, the client application functions as an endpoint or user agent of its user. In some embodiments, the client application implements application-specific functionality that enables an instance of the client application to function as, by way of example, an instant messaging client, a voice over IP client, a teleconferencing client, a video conferencing client, an application sharing client, an audio/video client, any other client that establishes a real-time application-level session with another client application, or any combination thereof. For example, a user can use an instance of the client application to create a real-time instant messaging session (i.e., a real-time session in the instant messaging mode) with another user.

In some embodiments, the client application provides a user interface through which a user can initiate a logical conversation. For example, the user interface may provide a "button" or a "link" which the user can click to access a window for the logical conversation, and through which the user can request to establish a real-time session (i.e., the first real-time session belonging to the just-initiated logical conversation) in a desired mode with another user. Upon successfully creating the requested real-time session, the user may be provided a sub-window, a pane, or other suitable interface within the logical conversation window with which the user can participate in the created real-time session. For example, when the user uses the logical conversation window to create an instant messaging session, the user may be provided an instant messaging pane within the logical conversation window with which the user can instant message.

When the client application receives a request to establish a real-time session and the conversation identifier, the client application checks to determine if the logical conversation identified by the conversation identifier is currently running on the client. If the logical conversation is currently running on the client, the client application identifies the window for this logical conversation and provides an indication of the received request in the identified window. For example, the client application may display a link for the received real-time session in the identified window. A user may then click on the link to "accept" the request to establish the real-time session. In this case, the client application may display a sub-window or pane within the identified window with which the user can participate in the newly created real-time session. If there are no logical conversations running that are identified by the conversation identifier, the client application creates a new logical conversation and creates and displays a window for the newly created logical conversation. The client application may then display a link for the received real-time session in the newly created window.

In this manner, the client application provides a window for each logical conversation that is running on a client. The logical conversation window may include a sub-window or other suitable interface for each real-time session associated with or belonging to the logical conversation. The logical conversation window may also allow the user to establish additional real-time sessions to be included as part of the logical conversation. For example, the logical conversation window may provide a link or a list of links the user can use to create an additional real-time session or sessions. Upon the creation of the additional real-time session, a sub-window for the newly created real-time session may be provided within the logical conversation window. Thus, each logical conversation window provides the user a visual representation of the real-time sessions on the client that are associated with or that belong to the logical conversation.

In other embodiments, the client application may provide a window for each real-time session created on the client. In these embodiments, the window may provide an indication of the logical conversation to which the real-time session associated with the window belongs. For example, the indication of the logical conversation may be provided in the title bar of the window.

In general terms, the client data store facilitates the storage of the information that associates a real-time session created on the client to a logical conversation running on the client. For example, the client application stores the information and/or data that associates the real-time session to the logical conversation to which the real-time session belongs in the client data store. In some embodiments, the client data store is a database that includes records that indicate the association of the real-time sessions to their respective logical conversations, as well as other suitable information.

Figure 3:
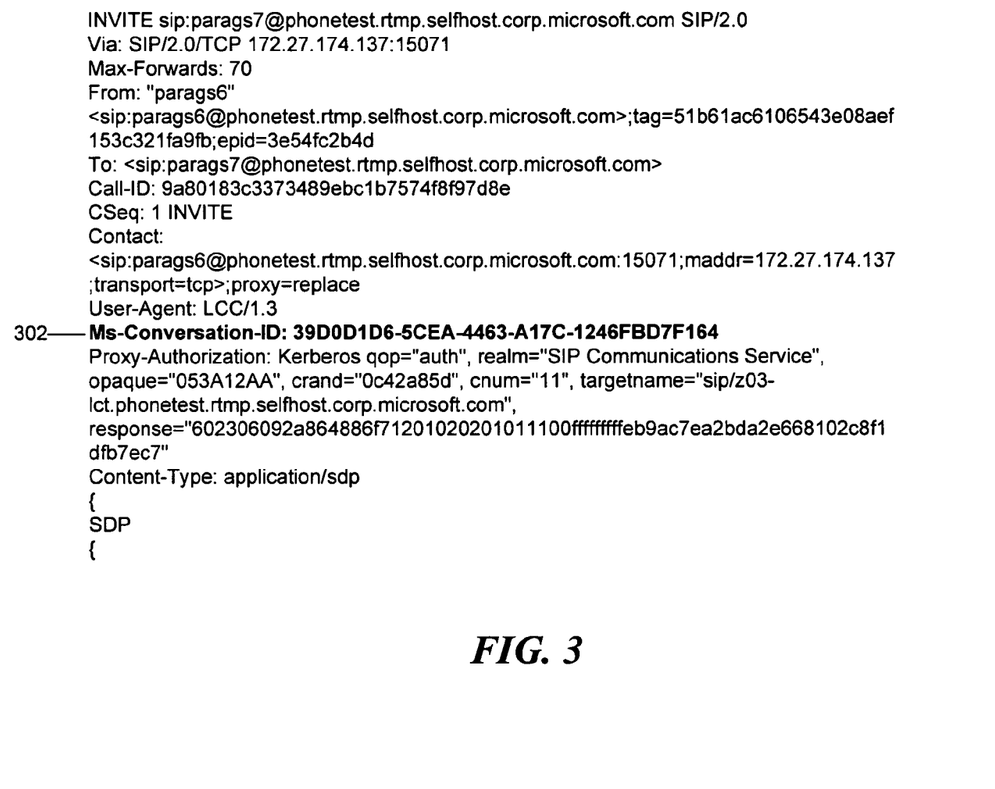
FIG. 3 illustrates an example SIP INVITE request that includes a conversation identifier, according to some embodiments.

FIG. 3 illustrates an example SIP INVITE request that includes a conversation identifier, according to some embodiments. As illustrated, the SIP INVITE request includes a conversation identifier header 302 whose value or contents uniquely identify a logical conversation. For example, the value of the conversation identifier header is "39D0D1D6-5CEA-4463-A17C-1246FBD7F164" and, thus, the SIP INVITE request is an invitation from calling participant "parags6" to called participant "parags7" to create a real-time application session (i.e., a dialog) within the logical conversation identified by the string "39D0D1D6-5CEA-4463-A17C-1246FBD7F164." In some embodiments, the value of the conversation identifier header is globally unique. In other embodiments, the conversation identifier may be transmitted between participants in a real-time session using any of a variety of well-known application-level protocols and/or signaling techniques.

Figure 4:
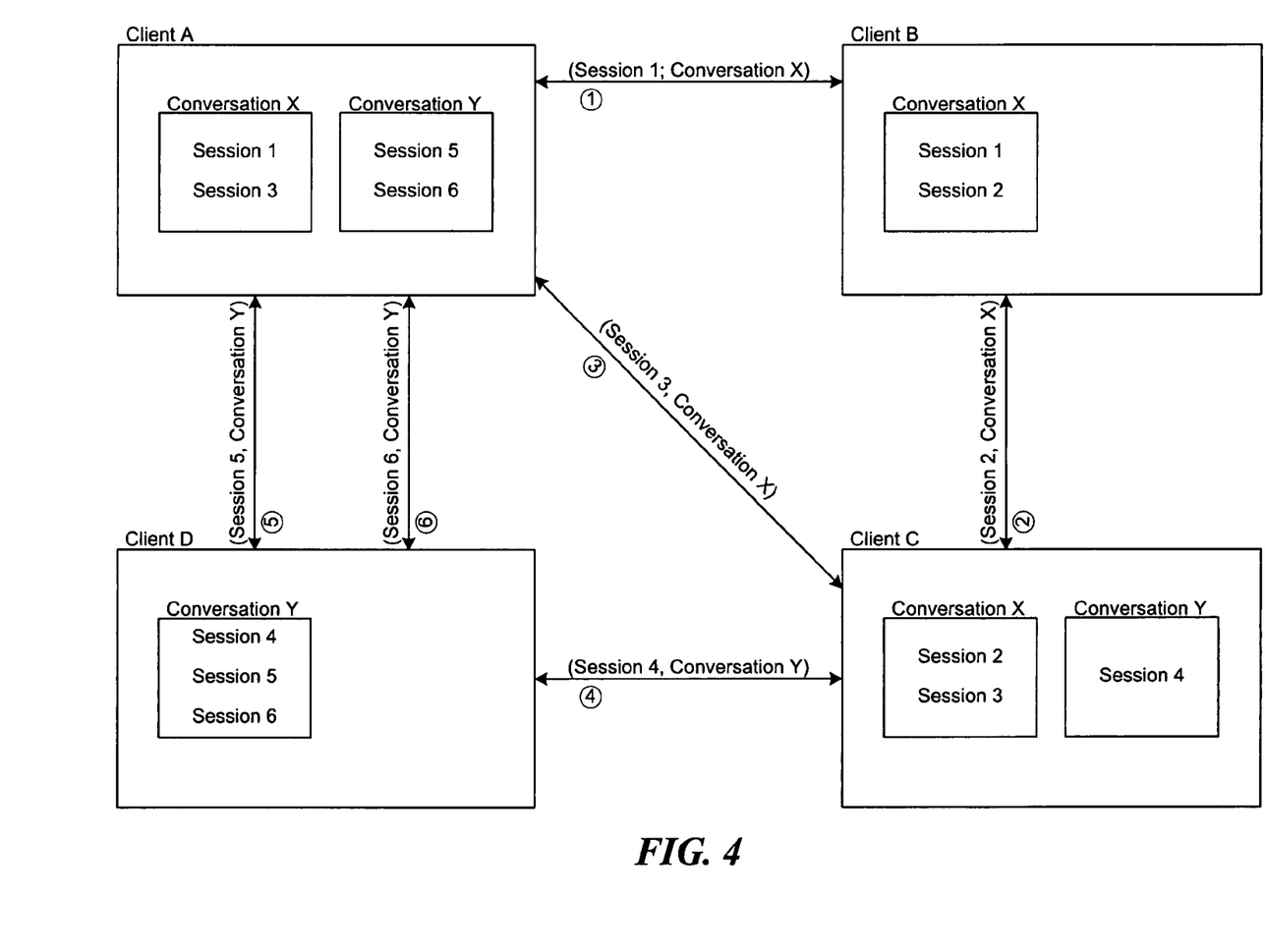
FIG. 4 is a diagram illustrating interactions between clients in sharing a conversation identifier across multiple real-time sessions without a centralized control, according to some embodiments.

FIG. 4 is a diagram illustrating interactions between clients in sharing a conversation identifier across multiple real-time sessions without a centralized control, according to some embodiments. By way of example, a user at client A may initiate a logical conversation by requesting an instant messaging session with a user at client B. In establishing the requested instant messaging session 1, client A generates a conversation identifier, for example, "Conversation X" that uniquely identifies the new logical conversation, and sends client B the conversation identifier with the request to create the instant messaging session. Upon creating the instant messaging session, for example, identified as "Session 1," client A and client B each associates "Session 1" to "Conversation X." For example, client A and client B may each create a table or a record for each logical conversation that is created on the client, and identify the real-time sessions belonging to an appropriate logical conversation in its corresponding table or record, or other suitable data structure.

The user at client B may then request an instant messaging session with a user at client C as part of the existing logical conversation "Conversation X." In establishing the requested instant messaging session 2, client B retrieves the conversation identifier "Conversation X," and sends client C the conversation identifier with the request to create the instant messaging session. Upon creating the instant messaging session, for example, identified as "Session 2," client B and client C each associates "Session 2" to "Conversation X." For example, client B may include an entry for "Session 2" in the table it previously created for "Conversation X." In this manner, "Session 1" and "Session 2" are associated with the same logical conversation "Conversation X" on client B. Client C may create a table for "Conversation X" and include an entry for "Session 2" in this table.

The user at client C may then request an application sharing session with the user at client A as part of the existing logical conversation "Conversation X." In establishing the requested application sharing session 3, client C retrieves the conversation identifier "Conversation X," and sends client A the conversation identifier with the request to create the application sharing session. Upon creating the application sharing session, for example, identified as "Session 3," client B and client C each associates "Session 3" to "Conversation X" by, for example, including an entry for "Session 3" in the table it previously created for "Conversation X."

The user at client C may then initiate a new logical conversation by requesting an audio/video session with a user at client D. In establishing the requested audio/video session 4, client C generates a conversation identifier, for example, "Conversation Y" that uniquely identifies the new logical conversation, and sends client D the conversation identifier with the request to create the audio/video session. Upon creating the audio/video session, for example, identified as "Session 4," client C and client D each associates "Session 4" to "Conversation Y" by, for example, creating a table for "Conversation Y" and including an entry for "Session 4" in the table created for "Conversation Y."

The user at client D may then request an instant messaging session with the user at client A as part of the existing logical conversation "Conversation Y." In establishing the requested instant messaging session 5, client D retrieves the conversation identifier "Conversation Y," and sends client A the conversation identifier with the request to create the instant messaging session. Upon creating the instant messaging session, for example, identified as "Session 5," client D and client A each associates "Session 5" to "Conversation Y." For example, client D may include an entry for "Session 5" in the table it previously created for "Conversation Y." Client A may create a table for "Conversation Y" and include an entry for "Session 5" in this table.

The user at client A may then request an application sharing session with the user at client D as part of the existing logical conversation "Conversation Y." In establishing the requested application sharing session 6, client A retrieves the conversation identifier "Conversation Y," and sends client D the conversation identifier with the request to create the application sharing session. Upon creating the application sharing session, for example, identified as "Session 6," client A and client D each associates "Session 6" to "Conversation Y" by, for example, including an entry for "Session 6" in the table it previously created for "Conversation Y."

Thus, multiple real-time sessions may be associated with a single logical conversation on a client. Moreover, since each of the real-time sessions may be any of a variety of modes, multiple modes may be associated with the single logical conversation on the client.

In some embodiments, upon termination of a real-time session, the identifier of the terminated real-time session is removed from the table or record corresponding to the logical conversation to which the terminated real-time session belonged. In some embodiments, when all real-time sessions belonging to a logical conversation are terminated, table or record corresponding to the logical conversation is removed (e.g., deleted).

In some embodiments, the initiator of a logical conversation may specify policies that are to be applied to the logical conversation. For example, the policies may specify information such as, who is allowed to join the logical conversation, what modes are allowed in the logical conversation, what times are permitted for conducting the logical conversation, etc. The specified policies may be passed to the clients along with the conversation identifier.

In some embodiments, a participant in a logical conversation may query one or more other participants in the logical conversation to determine information regarding the logical conversation. For example, a participant A may be conducting an instant messaging session with a participant B as part of a logical conversation, and may query participant B for information regarding other sessions that participant B is participating in. In this manner, participant A can create a roster of active sessions in the logical conversation. Similarly, participant A can create a roster of participants participating in a logical conversation by, for example, querying participant B for information regarding the other participants with whom participant B is actively conducting sessions with.

Figure 5:
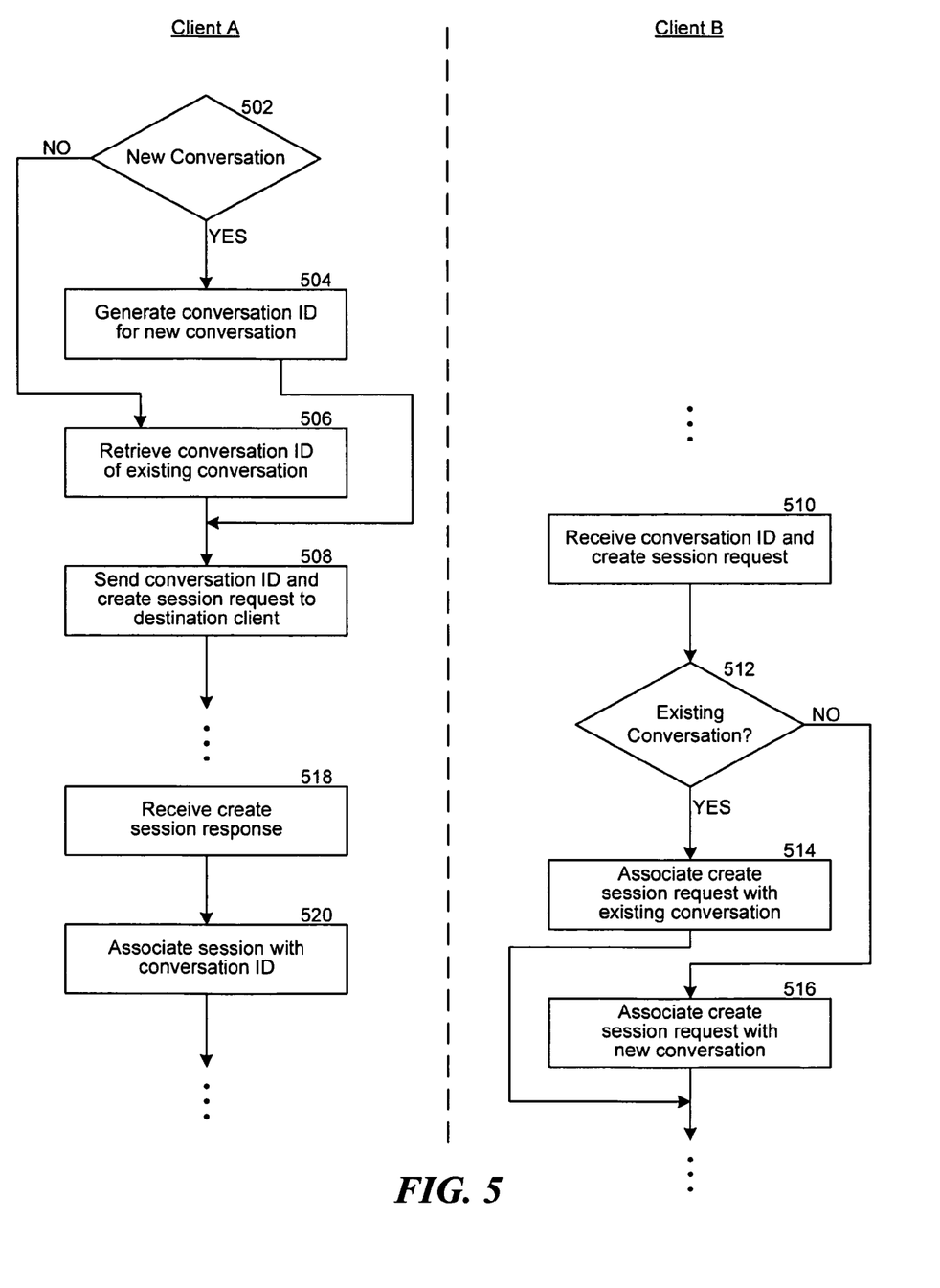
FIG. 5 is a flow diagram illustrating the sending of a conversation identifier between two clients, according to some embodiments.

FIG. 5 is a flow diagram illustrating the sending of a conversation identifier between two clients, according to some embodiments. By way of example, a calling participant at a client A may use an instance of a client application to submit a request to create an application sharing session with a called participant at a client B. In block 502, the client application on client A checks to determine whether the request is for a new logical conversation on client A. Stated another way, the client application checks to determine if the request to create the application sharing session is the first session that is signaled in a logical conversation.

If the request is for a new logical conversation, then, in block 504, the client application generates a new conversation identifier that uniquely identifies the new logical conversation. The client application may use any of a variety of well-known techniques to generate a unique identifier. Otherwise, if the request is not for a new logical conversation, but is a part of a logical conversation that currently exists on client A, then, in block 508, the client application retrieves the conversation identifier of the existing logical conversation. In block 508, the client application sends the conversation identifier (i.e., either the newly generated conversation identifier, or the retrieved conversation identifier) and the request to create the application sharing session to client B.

In block 510, an instance of a client application on client B receives the conversation identifier and the request to create the application sharing session from client A. In block 512, the client application checks to determine if the received conversation identifier matches any of the logical conversations that are active on client B. If the received conversation identifier matches a logical conversation that is currently active, then, in block 514, the client application associates the request to create the application sharing session with the currently existing logical conversation that is identified by the conversation identifier. Conversely, if the received conversation identifier does not match any of the logical conversation that are currently active, then, in block 516, the client application creates a new logical conversation on client B, identifies the newly created logical conversation using the received conversation identifier, and associates the request to create the application sharing session with the newly created logical conversation. The client application may then provide the called participant an indication of the received request to create the application sharing session. If the called participant accepts the request, the client application sends client A an appropriate response message creating the application sharing session, and associates the application sharing session to the logical conversation (i.e., either the existing logical conversation identified by the conversation identifier, or the newly created logical conversation).

Subsequently, in block 518, the client application on client A receives the response message to create the application sharing session. In block 520, the client application associates the application sharing session with the logical conversation identified by the conversation identifier.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method for providing multimodal conversation without a centralized control, the method comprising:

receiving, at a client, a first request to establish a first real-time session between a first user and a second user, wherein the first user is different from the second user and wherein the first request includes a globally unique conversation identifier uniquely identifying a logical conversation;

creating the first real-time session between the first user and the second user;

receiving, at the client, a second request to establish a second real-time session between the first user and a third user, wherein the third user is different from the first user and the second user and wherein the second request includes the conversation identifier;

creating the second real-time session between the first user and the third user, wherein the second real-time session is displayed separately from the first real-time session and wherein the second real-time session does not include the second user;

determining whether the conversation identifier identifies an existing logical conversation on the client;

responsive to determining that the conversation identifier identifies an existing logical conversation on the client, associating the first and second real-time sessions with the existing logical conversation identified by the conversation identifier, the existing logical conversation having an associated third real-time session corresponding to a communication session between the first user and a fourth user, the fourth user being different from the first, second, and third users and wherein the fourth real-time session is displayed separately from the first, second, and third real-time sessions and wherein the fourth real-time session does not include the second user and does not include the third user;

responsive to determining that the conversation identifier does not identify an existing logical conversation on the client, creating a new logical conversation on the client, associating the newly created logical conversation with the conversation identifier, and associating the first and second real-time sessions with the newly created logical conversation wherein the first real-time session is in a first mode and wherein the second real-time session is in a second mode different from the first mode so that the newly created logical conversation is associated with multiple modes.

2. The method of claim 1, wherein the request to establish the real-time session is sent by a remote client.

3. The method of claim 1, wherein the request to establish the real-time session is signaled via a SIP message.

4. The method of claim 3, wherein the conversation identifier is included as part of the SIP message.

5. The method of claim 1, wherein the request to establish the real-time session is for a first mode, and further wherein associating the newly created real-time session with the existing logical conversation associates the first mode with the logical conversation.

6. The method of claim 5, wherein the existing logical conversation comprises at least one real-time session in the second mode.

7. The method of claim 1, wherein the request to establish the real-time session is a request to establish an instant messaging session.

8. The method of claim 1, wherein the request to establish the real-time session is a request to establish an application sharing session.

9. The method of claim 1, wherein the request to establish the real-time session is a request to establish an audio/video session.

10. A method, performed by a computer having a memory and a processor, the method comprising:

determining at the first client that it is an initiator of a logical conversation; and after determining at the first client that the first client is the initiator of the logical conversation, generating a globally unique identifier that identifies the logical conversation, sending to a second client the unique identifier identifying the logical conversation in a first SIP INVITE request to establish a first real-time session in the logical conversation, with a processor, establishing the first real-time session, wherein the first client and the second client interact across the first real-time session without centralized control, with a processor, associating, at the first client, the first real-time session with the logical conversation, sending to a third client the unique identifier identifying the logical conversation in a second SIP INVITE request to establish a second real-time session in the logical conversation, with a processor, establishing the second real-time session, wherein the first client and the third client interact across the second real-time session without centralized control and wherein the second real-time session is signaled separately from the first real-time session so that the first client can maintain separate real-time sessions with each of the second and third clients, and with a processor, associating, at the first client, the second real-time session with the logical conversation wherein the first real-time session is in a first mode and wherein the second real-time session is in a second mode different from the first mode so that the logical conversation is associated with multiple modes.

11. The method of claim 10, wherein the request to establish the first real-time session is a request to establish a real-time session with a remote client.

12. The method of claim 10, wherein the unique identifier is included in the header of the first and the second SIP INVITE requests.

13. The method of claim 10, wherein the request to establish the first real-time session is a request to establish a teleconferencing session.

14. The method of claim 10, wherein the request to establish the first real-time session is a request to establish a videoconferencing session.

15. The method of claim 10 further comprising:

after determining at the first client that the first client is not the initiator of the logical conversation, determining an existing logical conversation and an existing conversation identifier that uniquely identifies the existing logical conversation, the existing logical conversation associated with at least one existing real-time session;

sending the existing conversation identifier in a request to establish a subsequent real-time session in the existing logical conversation; and after establishing the subsequent real-time session, associating the established subsequent real-time session with the existing logical conversation.

16. The method of claim 15, wherein the at least one existing real-time session and the subsequent real-time session are with different clients.

17. The method of claim 15, wherein the at least one existing real-time session and the subsequent real-time session are with the same client.

18. The method of claim 10, further comprising:

receiving from a fourth client the unique identifier identifying the logical conversation in a third SIP INVITE request to establish a third real-time session in the logical conversation.

19. A system having a memory and a processor for providing multimodal conversation, the system comprising:

a component at a first client configured to receive from a first user a first request to establish a first real-time session with a second user, the first request including a first globally unique conversation identifier uniquely identifying a first logical conversation;

a component at the first client configured to receive from the first user a second request to establish a second real-time session with a third user, the second request including the first conversation identifier; and a component at the first client configured to create a first logical conversation on the first client and associate the first real-time session and the second real-time session with the first logical conversation, the first logical conversation being identified by the first conversation identifier wherein the first real-time session and the second real-time session are signaled separately so that the first user can maintain separate real-time sessions with each of the second and third users wherein messages sent from the first client to the second user as part of the first real-time session are not received by the third user and wherein messages sent from the first client to the third user as part of the second real-time session are not received by the second user wherein the first real-time session is in a first mode and wherein the second real-time session is in a second mode different from the first mode so that the first logical conversation is associated with at least two modes and wherein the components comprise computer-executable instructions stored in memory for execution by the processor.

20. The system of claim 19, further comprising:

a component at the first client configured to query a second client for a list of participants with whom a user at the second client is actively conducting a real-time session associated with the first logical conversation.

21. The system of claim 19, further comprising:

a component at the first client configured to receive from the first user a third request to establish a third real-time session with a fourth user, the third request including a second conversation identifier uniquely identifying a second logical conversation, wherein the first conversation identifier is different from the second conversation identifier;

a component at the first client configured to receive from the first user a fourth request to establish a fourth real-time session with a fifth user, the fourth request including the second conversation identifier; and a component at the first client configured to create a second logical conversation on the first client and associate the third real-time session and the fourth real-time session with the second logical conversation, the second logical conversation being identified by the second conversation identifier, so that the third real-time session and the fourth real-time session are each associated with the second logical conversation and not associated with the first logical real-time session wherein the first real-time session, the second real-time session, the third real-time session, and the fourth real-time session are signaled separately so that the first user can maintain separate communication sessions with each of the second, third, fourth, and fifth users, wherein messages sent from the first client to the fourth user as part of the third real-time session are not received by the fifth user and wherein messages sent from the first client to the fifth user as part of the fourth real-time session are not received by the fourth user, and wherein each of the first, second, third, and fourth real-time sessions are grouped according to their associated logical conversations.

22. The system of claim 21, further comprising:

a component configured to create and display a first window for the first logical conversation;

a component configured to create and display a second window for the second logical conversation, wherein the second window is different from the first window;

a component configured to create and display a first sub-window for the first real-time session, wherein the first sub-window is displayed within the first window;

a component configured to create and display a second sub-window for the second real-time session, wherein the second sub-window is displayed within the first window;

a component configured to create and display a third sub-window for the third real-time session, wherein the third sub-window is displayed within the second window; and a component configured to create and display a fourth sub-window for the fourth real-time session, wherein the fourth sub-window is displayed within the second window.

23. A method performed by a computing device having a memory and a processor, the method comprising:

determining at the first client that it is an initiator of a logical conversation;

generating a globally unique identifier that identifies the logical conversation, sending to a second client the unique identifier identifying the logical conversation in a first SIP INVITE request to establish a first real-time session in the logical conversation;

with a processor, establishing the first real-time session, wherein the first client and the second client interact across the first real-time session without centralized control;

with a processor, associating, at the first client, the first real-time session with the logical conversation by storing an indication of the first real-time session in a table associated with the unique identifier;

receiving from a third client the unique identifier identifying the logical conversation in a second SIP INVITE request to establish a second real-time session in the logical conversation;

with a processor, establishing the second real-time session, wherein the first client and the third client interact across the second real-time session without centralized control and wherein the second real-time session is signaled separately from the first real-time session; and with a processor, associating, at the first client, the second real-time session with the logical conversation by storing an indication of the second real-time session in the table associated with the unique identifier wherein the first real-time session and the second real-time session are signaled separately so that the first client can maintain separate real-time sessions with the second client and the third client and wherein both the first real-time session and the second real-time session are associated with the same unique identifier that is sent by the first client to the second client and received by the first client from the third client and wherein the first real-time session is in a first mode and wherein the second real-time session is in a second mode different from the first mode.

* * * * *